United States Patent [19]

Cuscurida et al.

[11] 4,296,213

[45] Oct. 20, 1981

[54] POLYURETHANE FOAMS USING A POLYUREA POLYMER POLYOL

[75] Inventors: Michael Cuscurida; George P. Speranza, both of Austin, Tex.

[73] Assignee: Texaco Inc., White Plains, N.Y.

[21] Appl. No.: 202,892

[22] Filed: Oct. 31, 1980

Related U.S. Application Data

[63] Continuation-in-part of Ser. No. 86,365, Oct. 17, 1979, abandoned.

[51] Int. Cl.³ .................. C08G 18/14; C08G 18/50; C08G 18/32
[52] U.S. Cl. .................. 521/166; 252/182; 260/33.2 R; 521/163; 521/164; 521/137
[58] Field of Search ............. 521/163, 164, 166, 137; 260/33.2 R; 252/182

[56] References Cited

U.S. PATENT DOCUMENTS

| | | | |
|---|---|---|---|
| 2,929,800 | 3/1960 | Hill | 521/163 |
| 3,294,751 | 12/1966 | Beitchman | 528/76 |
| 3,325,421 | 6/1967 | Muller | 260/29.2 TN |
| 3,590,002 | 6/1971 | Powers | 252/182 |
| 4,089,835 | 5/1978 | Koenig et al. | 521/137 |
| 4,107,102 | 8/1978 | Dahm et al. | 521/163 |
| 4,239,856 | 12/1980 | Rowton | 521/164 |

FOREIGN PATENT DOCUMENTS 2110055  9/1972  Fed. Rep. of Germany .

*Primary Examiner*—H. S. Cockeram
*Attorney, Agent, or Firm*—Carl G. Ries; Jack H. Park; Kenneth R. Priem

[57] ABSTRACT

A polyurea polymer polyol made by the reaction of a hydroxyl-containing amine, a polyether polyol of about 3,000 to 8,000 molecular weight and an organic polyisocyanate is disclosed. This polyurea polymer polyol may be used in the manufacture of flexible polyurethane foams which are firmer and stronger than similar products using conventional polyols.

11 Claims, No Drawings

POLYURETHANE FOAMS USING A POLYUREA POLYMER POLYOL

This is a Continuation-in-Part of application Ser. No. 086,365 filed Oct. 17, 1979 and now abandoned.

BACKGROUND OF THE INVENTION

1. Field of the Invention

This invention pertains to the field of polyurethane plastics.

2. Description of the Prior Art

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2000 to 3000 and above. These polyols are then reacted with polyisocyanate in the presence of water or other blowing agents such as fluorocarbons to obtain polyurethane foams. The prior art describes modified polyols in which vinyl monomers such as styrene or acrylonitrile or other materials such as hydrazine hydrate have been included to improve the properties of the polyol and thus, the properties of the resulting foam. However, some of these prior art materials are highly toxic and require in addition, stripping of unreacted vinyl monomers or water of hydration. U.S. Pat. No. 4,107,102 describes the manufacture of polyurethane foam using a polyol containing hydrazine and its adducts.

German Offenlegungsschrift No. 2,110,055 discloses a process for making a polyurethane product whereby a hydroxyl-containing amine is included in the formulation in a one-shot process. That is, the hydroxyl-containing amine is simply included initially with the polyol and the polyisocyanate and a polyurethane product results. The German process does not use a polyurea polymer polyol which is then reacted with a polyisocyanate. My invention makes improved polyurethane foams over the process of the German patent as will be made clear by the disclosure and the examples which follow.

U.S. Pat. No. 3,325,421 discloses the method of making a stable dispersion of a urea in a composition comprising an organic polyisocyanate, a diamine and a compound having at least two alcoholic hydroxyl groups.

SUMMARY OF THE INVENTION

The invention is a method for producing a polyurethane which comprises first making a polyurea polymer polyol by reacting a hydroxyl-containing amine, a polyether polyol and an organic polyisocyanate and then reacting said polyurea polymer polyol with an organic polyisocyanate. The invention is also the polyurea polymer polyol.

DESCRIPTION OF THE PREFERRED EMBODIMENTS

The polyurea polymer polyol is made by the reaction of a hydroxyl-containing amine, a polyether polyol and an organic polyisocyanate. The hydroxyl containing amine should range in molecular range from about 60 to about 200 and preferably from about 60 to about 150 and is exemplified by the following typical compounds: monoethanolamine, diethanolamine, 2-(2-aminoethoxyethanol), hydroxyethylpiperazine, N-methylethanolamine and 2-hydroxyethylethylenediamine.

The polyether polyol which is used has a hydroxyl number preferably between about 20 and 60. The polyol is generally an alkylene oxide adduct of a polyhydric alcohol, preferably a trihydric alcohol, with a functionality of from about 2 to about 4. The alkylene oxide may suitably by ethylene oxide, propylene oxide, or 1,2-butylene oxide or a mixture of some or all of these. The polyol will preferably have a molecular weight within the range of from about 2,000 to about 8,000 and more preferably, from about 3,000 to about 8,000. The alkylene oxide is preferably propylene oxide or a mixture of propylene oxide and ethylene oxide.

The ratio of moles of hydroxyl containing amine to moles of polyether polyol should range from about 0.5 to 3.5 and preferably from about 0.7 to 2.8.

The polyisocyanate used herein may be any aromatic or aliphatic polyisocyanate. Typical aromatic polyisocyanates include m-phenylene diisocyanate, p-phenylene diisocyanate, polymethylene polyphenyl polyisocyanates, 2,4-toluene diisocyanate, 2,6-tolulene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis-(3-methyl-4-isocyanatophenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

Since the polyurea polymer polyol has by definition free hydroxyl groups, the amount of polyisocyanate used to form the polyurea polymer polyol is less than the stoichiometric amount needed to satisfy the active hydrogens of the hydroxyl groups of the polyether polyol and the hydroxyl containing amine and the active amine hydrogens. Therefore, the ratio of moles of active hydrogens (from hydroxyl and amine) to moles of isocyanate groups should range from about 1.4 to 3.5 preferably from about 1.6 to 3.3.

The polyether polyol, hydroxyl containing amine and polyisocyanate can be successfully reacted without application of external heat and atmospheric pressure although higher temperatures and pressures would also be acceptable.

The polyurea polymer polyol prepared from the above ingredients is then incorporated into a formulation which results in a polyurethane product. The polyurea polymer polyol may be used in conjunction with a polyisocyanate such as those mentioned above or may be combined with additional polyol such as those mentioned above and reacted with a polyisocyanate to form a resulting polyurethane foam product.

The advantage of the method of my invention is in the preparation of the polyurea polymer polyol as a separate entity before incorporating it into a formulation for the preparation of a polyurethane foam product. The German Offenlegungsschrift No. 2,110,055 mentioned in the prior art section of this application mentions a process where a hydroxyl containing amine may be incorporated directly in a polyurethane formulation without first making a polyurea polymer polyol as I have done. As the data in Examples X and XI herein will show, the properties of the resulting foam made from such a one-shot method are inferior to the foam made from my method using the previously prepared polyurea polymer polyol.

In order to form the polyurethane foam, a catalyst useful in preparing foams of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, N,N-dimethylpiperazine, 1,4-diazabicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicylaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as Ti(OR)$_4$', Sn(OR)$_4$', Al(OR)$_3$', and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used in 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight based on 100 parts by weight of the polyurea polymer polyol and any additional polyol present. The organic blowing agents optionally used along with the water are known in the art and are, for example, monofluorotrichloromethane, difluorodichloromethane, methylene dichloride and others generally known in the art.

Additives to regulate the cell size and the cell structure, for example, silicone oil such as dimethylpolysiloxanes may also be added to the foaming mixture. Fillers, flame retarding additives, dyes or plasticizers of known types may also be used. These and other additives are well known to those skilled in the art.

The invention and its improvement over the art will now be illustrated with the aid of the following examples. These examples are intended to illustrate the invention but are not intended to delineate the expected scope of the invention.

EXAMPLE I

Into a one-liter three-necked flask equipped with a stirrer, thermometer, nitrogen source, and dropping funnel were charged 400 g THANOL® SF-5505* (0.072 moles) and 21 g 2-(2-aminoethoxy)ethanol (DIGLYCOLAMINE®) (0.2 moles). Toluene diisocyanate (TDI, 17.4 g) was then added dropwise over a 30-minute period. The temperature of the reactants rose from 25°-45° C. during this period with no external heat applied. After a 1.5 hour digestion period, the reaction was terminated. The resultant product was a white, opaque, viscous liquid with the following properties:

*A 5500 molecular weight polyether triol based on a glycerine initiator containing approximately 80% primary hydroxyl groups. Product of Texaco Chemical Company.

| | |
|---|---|
| Hydroxyl no., mg KOH/g | 53.2 |
| Water, wt % | 0.16 |
| Viscosity, 77° F., cps | 2100 |
| 100° F., cps | 1480 |
| Moles of active hydrogens / Moles of isocyanate groups | 2.7 |

EXAMPLE II

Using the procedure described in Example I, a polyurea polymer polyol was prepared by the dropwise addition of 12 g TDI to 18 g hydroxyethylpiperazine (0.138 moles) which was dissolved in 400 g THANOL SF-6503* polyol (0.062 moles). The resultant product was a white, opaque, viscous liquid with the following properties:

*A 6500 molecular weight polyether triol based on a glycerine initiator containing approximately 90% primary hydroxyl groups. Product of Texaco Chemical Company.

| | |
|---|---|
| Hydroxyl no. mg KOH/g | 57.4 |
| Water, wt % | 0.02 |

| | |
|---|---|
| Viscosity, 77° F., cps | 1910 |
| Moles of active hydrogens / Moles of isocyanate groups | 2.9 |

EXAMPLE III

Using the procedure of Example I, a polyurea polymer polyol was prepared by the dropwise addition of 17.4 g TDI to 6.1 g monoethanolamine (0.1 moles) dissolved in 400 g of THANOL SF-6503 (0.062 moles) polyol. After the TDI addition was completed, 1 drop (about 0.02 g) dibutyltin dilaurate was added to the reaction mixture to complete the reaction. The resultant product was a white, opaque viscous liquid which had the following properties:

| | |
|---|---|
| Hydroxyl no. mg KOH/g | 28.5 |
| Water, wt % | 0.04 |
| pH in 10:6 i-PrOH—H$_2$O | 9.3 |
| Viscosity, 77° F., cps | 8850 |
| Moles of active hydrogens / Moles of isocyanate groups | 1.62 |

EXAMPLE IV

Using the procedure of Example I, a polyurea polymer polyol was prepared by the dropwise addition of 15 g ISONATE® 143L[1] to 10 g hydroxyethylpiperazine (0.077 moles) dissolved in 475 g THANOL F-3520[2] polyol (0.114 moles). After the ISONATE 143L addition was completed, 1 drop (about 0.02 g) dibutyltin dilaurate was added to the reaction mixture to complete the reaction. The resultant product was a white, opaque, viscous liquid which had the following properties:

[1] Pure 4,4′diphenyl methane diisocyanate (MDI) modified so that it is a liquid at temperatures where MDI crystallizes. Product of the Upjohn Company.
[2] A 3500 molecular weight polyether triol based on a glycerine initiator. Product of Texaco Chemical Company.

| | |
|---|---|
| Hydroxyl no, mg KOH/g | 60.2 |
| Water, wt % | 0.05 |
| pH in 10:6 i-PrOH—H$_2$O | 8.0 |
| Viscosity, 77° F. cps | 2000 |
| Moles of active hydrogens / Moles of isocyanate groups | 2.7 |

EXAMPLE V

This example will illustrate a scale-up preparation of the polyurea polymer polyols of this invention.

Into a ten-gallon kettle were charged 38 lb. THANOL SF-6503 polyol (0.0058 lb. moles) and 0.86 lb. hydroxyethylpiperazine (0.007 lb. moles). The reactor was then evacuated and purged with prepurified nitrogen. TDI (1.14 lb.) was then added dropwise over a 20 minute period. The reaction mixture was then stirred 2 hours and 1.8 g dibutyltin dilaurate added. Stirring was continued an additional hour and the product drained from the kettle. The resultant product was a white, opaque, viscous liquid with the following properties:

| | |
|---|---|
| Hydroxyl no, mg KOH/g | 37.1 |
| Water, wt % | 0.02 |
| pH in 10:6 i-PrOH—H$_2$O | 9.5 |
| Viscosity, 77° F. cps | 17750 |
| Moles of active hydrogens / Moles of isocyanate groups | 1.9 |

EXAMPLE VI

Using the procedure of Example V, a polyurea polymer polyol was prepared by reaction of 1.04 lb. TDI with 0.96 lb. hydroxyethylpiperazine (0.00735 lb. moles) in the presence of 38 lb. THANOL SF-6503 polyol (0.0058 lb. moles). Dibutyltin dilaurate (1.8 g) was used for catalysis. The resultant product had the following properties:

| | |
|---|---|
| Hydroxyl no, mg KOH/g | 28.9 |
| Water, wt % | 0.11 |
| pH in 10:6 i-PrOH—H$_2$O, | 10.0 |
| Viscosity, 77° F., cps | 10300 |
| Moles of active hydrogens / Moles of isocyanate groups | 2.2 |

EXAMPLE VII

Using the procedure of Example V a polyurea polymer polyol was prepared by reaction of 0.86 lb. DIGLYCOLAMINE (0.0082 lb. moles) with 1.14 lb. TDI in the presence of 38 lb. THANOL SF-6503 polyol (0.0055 lb. moles). Dibutyltin dilaurate (1.8 g) was used for catalysis. The resultant product had the following properties:

| | |
|---|---|
| Hydroxyl no, mg KOH/g | 27.1 |
| Water, wt % | 0.02 |
| pH in 10:6 i-PrOH—H$_2$O | 7.0 |
| Viscosity, 77° F. cps | 15700 |
| Moles of active hydrogens / Moles of isocyanate groups | 2.5 |

EXAMPLE VIII

This example will illustrate the utility of the polyurea polymer polyols of this invention in the preparation of flexible urethane foams. It will further show that incorporation of 25-50% of the polyurea polymer polyols into the formulation effectively increases the load bearing properties (CLD) of the foam while maintaining good overall properties.

| Foam Number | A | B | C | D |
|---|---|---|---|---|
| Formulation, pbw | | | | |
| THANOL SF-6503 | 100 | 75 | 60 | 50 |
| Polyurea polymer polyol[1] | — | 25 | 40 | 50 |
| Water | 4.0 | 4.0 | 4.0 | 4.0 |
| Q2-5043 silicone[2] | 1.5 | 1.5 | 1.5 | 1.5 |
| L-6202 Silicone[3] | 0.5 | 0.5 | 0.5 | 0.5 |
| THANCAT® TD-33[4] | 0.3 | 0.3 | 0.3 | 0.3 |
| Stannous octoate[5] | 0.3 | 0.3 | 0.4 | 0.5 |
| Toluene diisocyanate | 44.8 | 46.5 | 45.95 | 48.1 |
| NCO/OH ratio | 1.05 | 1.07 | 1.05 | 1.05 |
| Details of preparation | | | | |
| Cream time, sec. | 10 | 10 | 10 | 10 |
| Rise time, sec. | 100 | 118 | 109 | 99 |
| Properties | | | | |
| Density, pcf | 1.82 | 190 | 1.74 | 1.73 |
| Tensile, psi | 17.85 | 23.0 | 14.9 | 13.4 |
| Elongation, % | 199 | 217 | 148 | 125 |
| Tear, pli | 3.2 | 4.1 | 2.1 | 2.0 |
| Compression set, 50% | 7.6 | 11.8 | 9.9 | 14.8 |
| 10  90% | 8.6 | 19.5 | 39.4 | 60.0 |

-continued

| Foam Number | A | B | C | D |
|---|---|---|---|---|
| CLD, 50% | 0.53 | 0.84 | 0.79 | 0.86 |

[1]Hydroxyl no. 43.8; prepared by reaction of 0.75 lb. TDI with 0.85 lb. hydroxyethyl-piperazine in the presence of 38.4 lb. THANOL SF-6503 polyol
[2]Dow Corning Corp.
[3]Union Carbide Chemical Corp.
[4]Texaco Chemical Co.; 33% triethylenediamine in propylene glycol
[5]Thermolite T-10; Metal and Thermit Corp.

EXAMPLE IX

This example will illustrate the use of the polyurea polymer polyols of this invention in the preparation of high resilience (HR) foam. It will further show that incorporation of 40% of the polyurea polymer polyols into the formulation effectively increases the tensile, tear, elongation and CLD of the resultant foams.

| Foam Number | A | B | C | D |
|---|---|---|---|---|
| Formulation, pbw | | | | |
| THANOL SF-5505 | 100 | — | — | 60 |
| THANOL SF-6503 | — | 100 | 60 | — |
| Polyurea polymer polyol[1] | — | — | 40 | 40 |
| Water | 3.8 | 3.8 | 3.8 | 3.8 |
| Q2-5043 silicone[2] | 2.0 | 2.0 | 2.0 | 2.0 |
| THANCAT TD-33[3] | 0.25 | 0.25 | 0.25 | 0.25 |
| NIAX A-1[4] | 0.25 | 0.25 | 0.25 | 0.25 |
| THANCAT DM-70[5] | 0.25 | 0.25 | 0.25 | 0.25 |
| Dibutyltin dilaurate[6] | 0.01 | 0.01 | — | — |
| 80/20 TDI/PAPI®[7] | 46.4 | 45.1 | 45.8 | 46.7 |
| NCO/OH ratio | 1.02 | 1.02 | 1.02 | 1.02 |
| Details of preparation | | | | |
| Cream time, sec. | 8 | 8 | 8 | 8 |
| Rise time, sec. | 115 | 110 | 115 | 110 |
| Gel time, sec. | 240 | 225 | 225 | 210 |
| Postcure, °C.(hr) | 100–105 (0.5) | 100–105 (0.5) | 100–105 (0.5) | 100–105 |
| Properties | | | | |
| Density, pcf. | 1.81 | Foam shrunk, discarded | 1.77 | 1.84 |
| Tensile, psi | 8.0 | | 12.6 | 10.0 |
| Elongation, % | 105 | | 138 | 118 |
| Tear, pli | 1.1 | | 1.5 | 1.3 |
| Compression set, 50% | 14.5 | | 58.9 | 29.0 |
| , 75% | 12.3 | | 77 | 25.0 |
| CLD, 50%, psi | 0.29 | | 0.32 | 0.34 |

[1]As in Example 5; hydroxyl no. 371.
[2]Dow-Corning Co.
[3]33% triethylenediamine in propylene glycol; Texaco Chemical Co.
[4]Bis(dimethylaminoethyl)ether; Union Carbide Chemical Corp.
[5]70% dimorpholinodiethylether 30% dimethylpiperazine; Texaco Chemical Co.
[6]Thermolite T-12; Metal and Thermit Corp.
[7]Eq. wt. 94.3 for the mixture. PAPI is a 2.7 functionality polymeric isocyanate. Product of the Upjohn Company.

EXAMPLE X

This example will illustrate the use of the polyurea polymer polyols of this invention in the preparation of high resilience foam (C). It will further show that foams prepared using the polyurea polymer polyols of this invention have improved properties as compared to those made from prior art formulations (A and B).

| Foam Number | A | B | C |
|---|---|---|---|
| Formulation, pbw | | | |
| THANOL SF-6503 | 99 | — | 60 |
| THANOL SF-5505 | — | 99 | — |
| HEP[1] | 1 | 1 | — |
| HEP/TDI/SF-6503 polyurea polymer polyol[2] | — | — | 40 |
| Water | 3.8 | 3.8 | 3.8 |
| Q2-5043 silicone[3] | 2.0 | 2.0 | 2.0 |
| THANCAT TD-33[4] | 0.25 | 0.25 | 0.25 |
| THANCAT DM-70[5] | 0.25 | 0.25 | 0.25 |
| NIAX A-1[6] | 0.25 | 0.25 | 0.25 |
| Dibutyltin dilaurate | 0.013 | 0.013 | 0.013 |
| 80/20 TDI/PAPI[7] | 46.5 | 47.9 | 45.3 |
| NCO/OH | 1.02 | 1.02 | 1.02 |
| Details of preparation | | | |
| Cream time, sec. | 6–7 | 6–7 | 7 |
| Rise time, sec. | 80 | 92 | 100 |
| Gel time, sec. | 225 | 270 | 255 |
| Postcure, °C.(hr.) | 100(0.5) | 100(0.5) | 100(0.5) |
| Foam appearance | Foam shrunk badly | Foam had large coarse cells | Foam had small uniform cells |
| Density, pcf | — | 2.38 | 2.0 |
| Tensile, psi | — | 10.9 | 14.4 |
| Elongation, % | — | 102 | 150 |
| Tear, pli - | — | 1.34 | 1.91 |
| Compression set, 50% | — | 19.1 | 40.8 |
| , 75% | — | 20.2 | 75.1 |
| CLD, 50%, psi | — | 0.292 | 0.354 |

[1]Hydroxyethylpiperazine
[2]Hydroxyl no. 28–29, prepared to contain 2.4% combined HEP
[3]Dow-Corning Corp.
[4]33% triethylenediamine in propylene glycol
[5]70% dimorpholinodiethyl ether, 30% dimethylpiperazine; Texaco Chemical Co.
[6]bis(dimethylaminoethyl)ether; Union Carbide Chemical Corp.
[7]Eq. wt. 94.3

EXAMPLE XI

This example further illustrates the use of the polyurea polymer polyols of this invention in the preparation of superior high resilience foams (B, D) as compared to those based on prior art formulations (A, C).

| Foam Number | A | B | C | D |
|---|---|---|---|---|
| Formulation, pbw | | | | |
| THANOL SF-6503 | 98.6 | 60 | — | — |
| THANOL SF-5505 | — | — | 98.6 | 60 |
| MEA[1] | 1.4 | — | 1.4 | — |
| MEA/TDI/THANOL SF-6503 polyurea polymer polyol[2] | — | 40 | — | 40 |
| Water | 3.8 | 3.8 | 3.8 | 3.8 |
| Q2-5043 silicone | 2.0 | 2.0 | 2.0 | 2.0 |
| THANCAT TD-33 | 0.25 | 0.25 | 0.25 | 0.25 |
| THANCAT DM-70 | 0.25 | 0.25 | 0.25 | 0.25 |
| NIAX A-1 | 0.25 | 0.25 | 0.25 | 0.25 |
| Dibutyltin dilaurate | 0.013 | 0.013 | 0.013 | 0.013 |
| 80/20 TDI/PAPI | 49.4 | 46.7 | 50.8 | 46.5 |
| NCO/OH | 1.02 | 1.02 | 1.02 | 1.02 |
| Details | | | | |
| Cream time, sec. | 6 | 8 | 5 | 8 |
| Rise time, sec. | 92 | 110 | Too | 110 |

| Foam Number | A | B | C | D |
|---|---|---|---|---|
| Gel time, sec. | 255 | 255 | fast to handle | 225 |
| Post cure, °C.(hr.) | 100(0.5) | 100(0.5) | | |
| Results | Foam had large coarse cells | Foam had small uniform cells | | Foam had small uniform cells |

[1] Monoethanolamine
[2] Lot 5215-41, hydroxyl no. 35.3 mg KOH/g, contains 1.4% combined MEA.

We claim:

1. A polyurea polymer polyol made by the reaction of a hydroxyl-containing amine, a polyether polyol of about 3000 to 8000 molecular weight and an organic polyisocyanate wherein the ratio of moles of hydroxyl containing amine to moles of polyether polyol ranges from about 0.5 to 3.5 and the ratio of moles of active hydrogens to moles of isocyanate groups ranges from about 1.4 to 3.5.

2. A polyol as in claim 1 wherein the hydroxyl-containing amine is monoethanolamine.

3. A polyol as in claim 1 wherein the hydroxyl-containing amine is diethanolamine.

4. A polyol as in claim 1 wherein the hydroxyl-containing amine is 2-(2-aminoethoxyethanol).

5. A polyol as in claim 1 wherein the hydroxyl-containing amine is hydroxyethylpiperazine.

6. A method for producing a polyurethane which comprises first making a polyurea polymer polyol by reacting a hydroxyl-containing amine, a polyether polyol and an organic polyisocyanate wherein the ratio of moles of hydroxyl containing amine to moles of polyether polyol ranges from about 0.5 to 3.5 and the ratio of moles of active hydrogens to moles of isocyanate groups ranges from about 1.4 to 3.5 and then reacting said polyurea polymer polyol with an organic polyisocyanate.

7. A method as in claim 6 wherein the hydroxyl-containing amine is monoethanolamine.

8. A method as in claim 6 wherein the hydroxyl-containing amine is diethanolamine.

9. A method as in claim 6 wherein the hydroxyl-containing amine is 2-(2-aminoethoxyethanol).

10. A method as in claim 6 wherein the hydroxyl-containing amine is hydroxyethylpiperazine.

11. A method as in claim 6 wherein the polyurea polymer polyol is reacted with an organic polyisocyanate in the presence of another polyether polyol.

* * * * *